US010515015B2

(12) United States Patent
Levy et al.

(10) Patent No.: US 10,515,015 B2
(45) Date of Patent: Dec. 24, 2019

(54) HASH TABLE-BASED MASK LENGTH COMPUTATION FOR LONGEST PREFIX MATCH CACHING

(71) Applicant: MELLANOX TECHNOLOGIES TLV LTD., Raanana (IL)

(72) Inventors: Gil Levy, Hod Hasharon (IL); Aviv Kfir, Nili (IL); Salvatore Pontarelli, Rome (IT); Pedro Reviriego, Madrid (ES)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 76 days.

(21) Appl. No.: 15/925,815

(22) Filed: Mar. 20, 2018

(65) Prior Publication Data

US 2019/0294549 A1    Sep. 26, 2019

(51) Int. Cl.
| | |
|---|---|
| *G06F 12/08* | (2016.01) |
| *G06F 12/0864* | (2016.01) |
| *H04L 12/747* | (2013.01) |
| *H04L 12/743* | (2013.01) |
| *H04L 12/745* | (2013.01) |

(52) U.S. Cl.
CPC ........ *G06F 12/0864* (2013.01); *H04L 45/742* (2013.01); *H04L 45/748* (2013.01); *H04L 45/7453* (2013.01); *G06F 2212/154* (2013.01)

(58) Field of Classification Search
CPC ............. G06F 12/0864; G06F 12/1018; G06F 2212/154; H04L 45/742; H04L 45/7453; H04L 45/748

USPC ................................ 711/118, 212, 216, 221
See application file for complete search history.

(56) References Cited

U.S. PATENT DOCUMENTS

| | | | |
|---|---|---|---|
| 6,754,662 | B1 | 6/2004 | Li et al. |
| 9,160,650 | B2 | 10/2015 | Zhang et al. |
| 9,596,181 | B1* | 3/2017 | Goel ..................... H04L 45/748 |
| 2001/0028651 | A1 | 10/2001 | Murase |
| 2004/0085953 | A1 | 5/2004 | Davis |
| 2005/0038907 | A1* | 2/2005 | Roeder .................. H04L 45/00 |
| | | | 709/238 |
| 2005/0091443 | A1 | 4/2005 | Hershkovich et al. |
| 2006/0209725 | A1 | 9/2006 | Cadambi et al. |
| 2008/0212586 | A1 | 9/2008 | Wang et al. |
| 2009/0077076 | A1 | 3/2009 | Berger et al. |

(Continued)

OTHER PUBLICATIONS

Gupta et al., "Routing Lookups in Hardware at Memory Access Speeds", Proceedings of the Conference on Computer Communications (IEEE INFOCOMM), vol. 3, pp. 1241-1248, San Francisco, USA, Mar./Apr. 1998.

(Continued)

*Primary Examiner* — Gary J Portka
(74) *Attorney, Agent, or Firm* — Kligler & Associates (57) ABSTRACT

A data packet is received in a network element. The network element has a cache memory in which cache entries represent a portion of addresses stored in a main memory, The destination address and the cache entries each comprise a binary number. A hash function is applied to the masked destination address to access a hash table. When the number of most significant bits corresponding to the value in the hash table in one of the cache entries and in the destination address are identical, routing information for the packet is retrieved from the cache entry.

22 Claims, 6 Drawing Sheets

(56) References Cited

U.S. PATENT DOCUMENTS

| | | | |
|---|---|---|---|
| 2010/0040066 A1* | 2/2010 | Hao | H04L 45/00 370/395.31 |
| 2010/0080223 A1 | 4/2010 | Wong et al. | |
| 2012/0246411 A1 | 9/2012 | Birka et al. | |
| 2013/0297879 A1 | 11/2013 | Abali et al. | |
| 2015/0039836 A1 | 2/2015 | Wang et al. | |
| 2015/0098470 A1 | 4/2015 | Sun et al. | |
| 2015/0131665 A1* | 5/2015 | Griswold | H04L 45/745 370/392 |
| 2016/0335296 A1* | 11/2016 | Sathe | H04L 45/74 |
| 2017/0366459 A1 | 12/2017 | Kfir et al. | |
| 2017/0366502 A1 | 12/2017 | Kravchik et al. | |

OTHER PUBLICATIONS

Kasnavi et al., "A cache-based internet protocol address lookup architecture", Computer Networks, vol. 52, pp. 303-326, year 2008.

Kim et al, "Revisiting Route Caching: TheWorld Should Be Flat", Proceedings of the 10th International Conference on Passive and Active Network Measurement (PAM), 10 pages, Seoul, Korea, Apr. 1-3, 2009.

Kohler et al., "Observed Structure of Addresses in IP Traffic", IEEE/ACM Transactions on Networking, vol. 14, No. 6, pp. 1207-1218, Dec. 2006.

Liu et al., "Efficient FIB Caching using Minimal Non-overlapping Prefixes", ACM SIGCOMM Computer Communication Review, vol. 43, No. 1, pp. 15-21, Jan. 2013.

Sarrar et al., "Leveraging Zipf's Law for Traffic Offloading", ACM SIGCOMM Computer Communication Review, vol. 42, No. 1, pp. 17-22, Jan. 2012.

WAND Network Research Group, 7 pages, Apr. 22, 2010 (downloaded from http://wand.net.nz/wits/catalogue.php).

The CAIDA Anonymized Internet Traces 2014 Dataset, 2 pages, 2014 https://www.caida.org/data/passive/passive_2014_dataset.xml.

Waldvogel et al., "Scalable High-Speed Prefix Matching", Proceedings of the ACM SIGCOMM 97 Conference on applications, technologies, architectures, and protocols for computer communication, Cannes, France, pp. 25-36, Sep. 15-18, 1997.

Levy et al., U.S. Appl. No. 15/469,530, filed Mar. 26, 2017.
Levy et al., U.S. Appl. No. 15/830,021, filed Dec. 4, 2017.
U.S. Appl. No. 15/469,530 office action dated Dec. 14, 2018.
U.S. Appl. No. 16/039,372 office action dated Jul. 23, 2019.
U.S. Appl. No. 15/830,021 office action dated Sep. 26, 2019.

* cited by examiner

HASH TABLE-BASED MASK LENGTH COMPUTATION FOR LONGEST PREFIX MATCH CACHING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information. More particularly, this invention relates to cache operations in the routing of packets in data switching networks.

2. Description of the Related Art

The meanings of certain acronyms and abbreviations used herein are given in Table 1.

TABLE 1

Acronyms and Abbreviations

| | |
|---|---|
| DIP | Destination Internet Protocol Address |
| DRAM | Dynamic Random Access Memory |
| HCA | Host Channel Adapter |
| IP | Internet Protocol |
| IPv4 | Internet Protocol Version 4 |
| LPM | Longest Prefix Match |
| MSB | Most Signficant Bits |
| NIC | Network Interface Card |
| RIB | Routing Information Base |
| RIF | Router Interface |
| SRAM | Static Random Access Memory |
| TCAM | Ternary Content Addressable Memory |

Modern internet routers determine data routing based on searching for a packet destination IP address (DIP) in a database of forwarding information known as a routing table. The routing table, rather than storing a full DIP, stores only some of the leading portion, known as a prefix. The prefix comprises some number of the most significant bits of the DIP. The remaining bits are treated as "don't care" bits for purpose of a DIP search in the routing table. However they specify a subnetwork or subnet. Computers that belong to a subnetwork are addressed by a common prefix in their IP address.

The most specific of the matching table entries—the one with the longest subnet mask—is called the longest prefix match (LPM). This is the entry in the routing table in which the largest number of leading address bits of the destination address match those in the table entry.

Searching the routing table for the LPM is a bottleneck in routing throughput. Various hardware-based solutions have been proposed. However, the circuitry required to implement such solutions becomes complex. Moreover, the increasing amount of internet traffic and demands for reduced latency have resulted in relatively costly router circuitry having high power consumption and heat dissipation.

For example, the document, *A Cache-Based Internet Protocol Address Lookup Architecture*, Soraya Kasnavi et al., Computer Networks 52 (2008) 303-326, proposes a Ternary Content Addressable Memory (TCAM) with a hardware-based LPM matching method. However, TCAM memory, while reducing the number of hash lookups, is expensive.

One option to ease the performance of an IP lookup is to implement a cache. In contrast to an LPM algorithm running on the main database, the cache can provide a lookup result with a single access to the cache database. Only searches that result in a cache miss require an IP address search by the LPM algorithm. Caching assumes that within a short period of time the same IP address is searched multiple times.

It is well known that traffic in networks in general and on the Internet in particular is not uniformly distributed. Rather, the traffic has been shown to follow a heavy tail distribution that can be modeled with a power law of a Zipf distribution. Such distributions are observed per prefix, per IP address and per flow showing that in all cases most of the traffic concentrates on a small percentage of all the elements. This distribution can be exploited in a well-constructed caching scheme.

A number of solutions have been proposed for LPM caching. Some of them employ the same algorithm on the cache and on an external device or network element, e.g., a DRAM, a router or other network device. Other schemes make caching independent of the algorithm used in the external device. In one configuration an SRAM acts as a cache for the external device.

The simplest solution for caching is to find an exact match so that each IP address is cached as an entry on the SRAM. This may be sufficient in many cases. However, the number of IP addresses covered by the cache can be dramatically increased using the LPM feature. In general, any prefix that has no compatible longer prefix can be directly cached and used on a match. However, for prefixes that have longer compatible prefixes, caching can cause a "cache hiding" problem unless all the longer compatible prefixes have also been cached. A packet to one such longer compatible prefix that is not in the cache will be incorrectly routed according to a shorter prefix stored in the cache.

There are different ways to deal with cache hiding. In one solution when a prefix is placed in the cache all longer compatible prefixes are also placed. However, this is complex to implement, particularly eviction from the cache. In a simpler approach, the length of the longest prefix that is present in the routing table is used for caching. This was explored in the document *Revisiting Route Caching: the World Should Be Flat*", C. Kim et al., Proceedings of the 10th International Conference on Passive and Active Network Measurement (PAM), but under the assumption that prefixes longer that /24 were not present in the table or were handled using a small additional table. The solution creates a /24 entry on the cache for a packet and effectively caches 256 subnet addresses per entry ($2^{(32-24)}=2^8=256$). However, a direct implementation of the scheme is impractical because there may be prefixes up to /32 in the table.

Another approach involves expansion of the routing table to ensure that it has no compatible prefixes, as proposed in the document *Efficient Fib Caching Using Minimal Non-Overlapping Prefixes*, Y. Liu, S. O. Amin and L. Wang, ACM SIGCOMM Computer Communication Review, January 2013. For example, if there is a /24 prefix with a compatible /32 prefix, /25, /26, . . . , /31 prefixes that are not compatible in the last bit with the /32 prefix are created. Those prefixes include patterns of all possible DIP addresses in the /24 prefix other than the /32 prefix. Therefore, for the purpose of routing they are equivalent to the /24 prefix when the /32 prefix is present.

SUMMARY OF THE INVENTION

There is provided according to embodiments of the invention a method of communication, which is carried out by assigning a mask length, receiving a packet via a data network, providing a cache memory in which entries correspond to addresses of a main memory. The destination address of the packet and the cache entries are each represented by a binary number. The method is further carried out by masking the destination address with the mask length, applying a hash function to the masked destination address to access a hash table, obtaining a value from the hash table, determining that a number corresponding to the value in the hash table of most significant bits in one of the cache entries and in the destination address are identical, and retrieving routing information for the packet from the cache entry.

In one aspect of the method the hash table is populated by: for each prefix in a rule set masking the prefix with the mask length, applying the hash function to the masked prefix to access the hash table, and in an event that the value in the accessed hash table is smaller than the prefix length of the prefix, replacing the value with the prefix length of the prefix.

A further aspect of the method includes adding a new prefix to the cache memory by masking the new prefix with the mask length, accessing the hash table with the masked new prefix, determining that the value in the accessed hash table is smaller than a number of most significant bits of the new prefix and replacing the value with the prefix length of the new prefix.

In yet another aspect of the method assigning a mask length includes masking each of a set of prefixes with candidates to generate candidate-masked prefixes, applying the hash function to the candidate-masked prefixes to access the hash table, associating a count of events with the current candidate wherein the value in the accessed hash table is larger than the prefix lengths, and thereafter choosing the candidate having a lowest associated count of events as the mask length. The method is further carried out when the prefix length of the current prefix is less than the value in the accessed hash table by generating expanded prefixes from the current prefix such that the prefix lengths of the expanded prefixes are equal to the current candidate, and increasing the associated count of events for the current candidate when the value in the accessed hash table is larger than the prefix lengths of the expanded prefixes.

Yet another aspect of the method includes deleting a specified prefix of the rule set from the cache memory by masking the specified prefix with the mask length, applying the hash function to the masked specified prefix to identify a target entry in the hash table, identifying other prefixes of the rule set that hash to the target entry by masking with the mask length and applying the hash function, and replacing the value of the target entry with a largest prefix length of the other prefixes.

Still another aspect of the method is carried out by dynamically changing the mask length to a new mask length, and updating the hash table using the new mask length. Updating the hash table includes prohibiting access to one half of the hash table and allowing access to another half of the hash table, and while prohibiting access to the one half of the hash table updating values thereof using the new mask length, thereafter prohibiting access to the other half of the hash table and allowing access to the one half of the hash table, and while prohibiting access to the other half of the hash table updating the values thereof using the new mask length, and thereafter allowing access to all of the hash table.

According to a further aspect of the method, the one half of the hash table and the other half of the hash table comprise alternate positions of the hash table.

There is further provided according to embodiments of the invention an apparatus, including a network element, which is operative for receiving a packet via a data network. The apparatus includes a processor in the network element, a main memory storing a database of packet forwarding information, and a hash table stored in a memory. A cache memory has entries therein that represent a portion of the packet forwarding information of the main memory, the destination address and the cache entries each represented by a binary number. The processor is configured to assign a mask length and perform steps comprising: masking the destination address with the mask length, applying a hash function to the masked destination address to access the hash table, obtaining a value from the hash table, determining that a number of most significant bits in one of the cache entries and the number of most significant bits of the destination address are identical, wherein the number of most significant bits is equal to the value of the hash table, and retrieving routing information for the packet from the one cache entry.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions

Most Significant Bit (MSB). In a binary number the most significant bit (MSB) is the bit position having the greatest value.

Most Significant Bits. In a binary number the most significant bits are the bits closest to and including the MSB.

The length of a prefix refers to the number of MSB in the prefix.

A prefix is compatible with another shorter prefix when it has the same MSBs as the shorter prefix for all the bits that are not masked in the shorter prefix.

A prefix is expanded when it is converted into several longer and more specific prefixes. For example, a prefix 0* can be expanded into four prefixes 000*, 001*, 010* and 011*. All of these share the same next hop routing information as the original prefix 0*.

According to disclosed embodiments of the invention, a hash table is formed by S positions that can hold an integer number that determines the length of a mask to be used for caching. Incoming elements are mapped to a position in the table using a hash function h(x), where x is the LPM field masked with an initial mask M. The value stored in the table at that position is the mask length for caching. The hash table is filled with all the prefixes that exist in a set of rules being evaluated.

The hash table has a fixed size that is independent of the length used for the access to the table. The inventive scheme enables the use of large mask lengths for accessing the table, which is beneficial for some databases, but also allows small mask length values to be stored in the table and used for caching.

The main drawback of the scheme is the performance loss introduced by collisions on the hash table. This can be managed by appropriately dimensioning the table.

System Overview.

Figure 1:
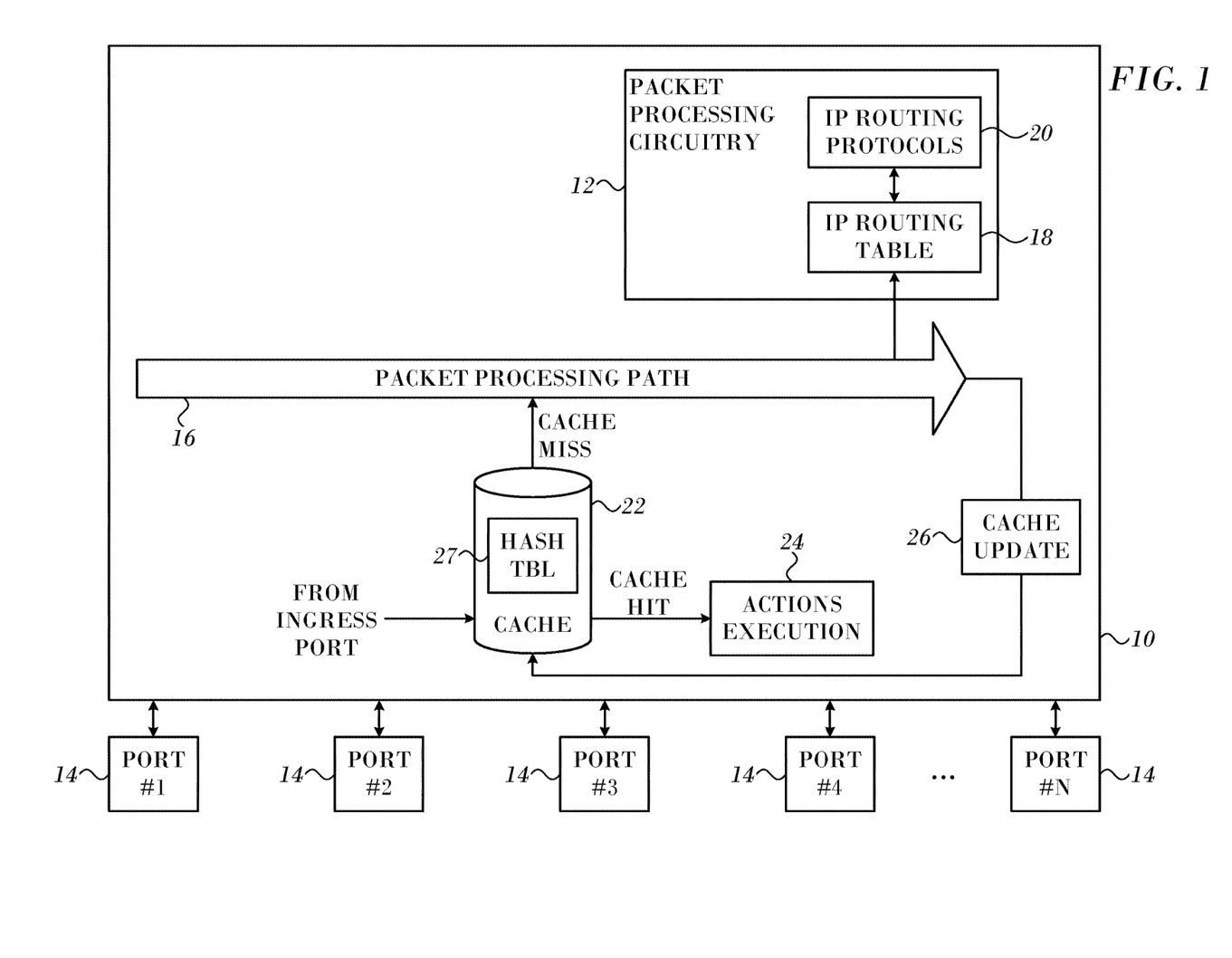
FIG. 1 is a block diagram of a network element in accordance with an embodiment of the invention.

Turning now to the drawings, reference is initially made to FIG. 1, which is a block diagram of a network element 10 in accordance with an embodiment of the invention. Network element 10 may comprise, for example, a network switch, a router or a network interface device such as a Network Interface Card (NIC) or Host Channel Adapter (HCA).

The network element 10 typically comprises packet processing circuitry 12, which may comprise a processor programmed with suitable software for coordinating and carrying out the functions described hereinbelow. Thus, although aspects of the network element 10 are shown in FIG. 1 and other figures hereof as comprising a number of separate functional blocks, these blocks are not necessarily separate physical entities, but rather could represent different computing tasks or data objects stored in a memory that is accessible to the processor. These tasks may be carried out in software running on a single processing element, or on multiple processors. The software may be embodied on any of a variety of known non-transitory media for use with a computer system, such as a diskette, or hard drive, or CD-ROM. The code may be distributed on such media, or may be distributed to the network element 10 from the memory or storage of another computer system (not shown) over a network. Alternatively or additionally, the tasks performed by packet processing circuitry 12 may be realized in hardware, such as a field programmable gate array or hard-wired logic.

Network element 10 may operate in any suitable communication network, and in accordance with any suitable communication protocol. Exemplary protocols may comprise Ethernet or InfiniBand.

Network element 10 comprises multiple ports 14, over which the network element receives input packets (also referred to as ingress packets) from a communication network and sends output packets (also referred to as egress packets) to the communication network. In a typical path or flow 16, packet processing circuitry 12 receives an input packet from one of ports 14 that is referred to as an ingress port, applies certain processing to the packet, and forwards the packet over one of ports 14 that is referred to as an egress port.

The network element 10 comprises a main database, IP routing table 18, which is used to obtain the route or prefix in order to forward the packet according to an IP routing protocol 20. Prefixes are also stored in a cache 22, which can be implemented as a DRAM or SRAM. For each packet a search of the cache 22 is conducted. Upon a cache hit actions regarding the new packet are performed by the packet processing circuitry 12 in an execution block 24. When there is a cache miss, reference is made to the routing table 18 to obtain the best matching route. Update of the cache may occur in block 26. The routing table 18 is sometimes referred to herein as the "main database", which can be implemented in a standalone memory or in embedded memory. A hash table 27, whose function is explained below, is stored in the cache 22 of the network element 10.

One of the tasks performed by the packet processing circuitry 12 comprises identifying the packet forwarding information using the cache. The following brief discussion explains the advantages of cache lookup according to embodiments of the invention compared with a straightforward approach.

Assume that the prefixes shown in Table 2 are stored in routing table 18:

TABLE 2

| Prefix | Forwarding information |
|---|---|
| 192.160.1.0/24 | RIF 1 |
| 192.160.0.0/16 | RIF 2 |

Table 3 illustrates cache entries created by several DIPs for this routing table. In the straightforward method, a cache entry stores the exact match of the searched IP address along with the result related to the LPM search, such as a forwarding decision.

TABLE 3

| | Cache entry created | |
|---|---|---|
| DIP | IP address | Forwarding information |
| 192.160.1.1 | 192.160.1.1 | RIF 1 |
| 192.160.1.2 | 192.160.1.2 | RIF 1 |
| 192.160.1.3 | 192.160.1.3 | RIF 1 |
| 192.160.2.1 | 192.160.2.1 | RIF 2 |
| 192.160.3.1 | 192.160.3.1 | RIF 2 |

A search in the cache is performed by requiring a full match between the DIP and the IP addresses of the cache. Large caches typically use hash tables to perform efficient searches.

It can be seen that caching the exact match of the DIP results in cache "pollution". Pollution means that many different cache entries are created for a given prefix. This reduces the efficiency of the cache.

However, caching a prefix rather than the full IP address may lead to a wrong decision. For example:

At initialization the cache is empty.

1. The first DIP searched is 192.160.2.1.

2. A LPM search results in matching the prefix 192.160.0.0/16. The forwarding for this prefix is RIF 2.

3. The following cache entry is created: 192.160.0.0/16. Forward to RIF 2.

4. The second searched DIP is 192.160.1.1.

5. A hit on the cache results in forwarding the packet to RIF 2. However the right forwarding decision for this packet is RIF 1 as the DIP matches the prefix 192.160.1.0/24, which is a longer prefix.

One solution to the deficiencies of the above-described method is disclosed in commonly assigned U.S. Patent Application Publication No. 20170366502 by Kravchik et al., entitled *IP Route Caching with Two Search Stages on Prefix Length*, which is herein incorporated by reference. In this approach a length M is set and a first access is done using a mask that selects the M upper bits of the IP address. This first access can return the result (forwarding action) or a value L indicating that a more specific search using a mask that selects the M+L upper bits is needed. This occurs when there are entries in the routing table that match the upper M bits of the packet and have a length larger than M. This solution works well, but has drawbacks: The value of M is relatively large in a practical system, e.g., 16 or 18. Several thousand entries may be required to populate a cache table in the lookup of the first stage, requiring a relatively large amount of memory. The reasons for such a large cache table in this solution can be appreciated from the following simplified example. Embodiments of the invention improve on this scheme because they are not limited by a large mask length M in the first access.

Consider the IPv4 routing information in Table 4 together with a cache that supports three possible masks: M=8, 24 and 32. Supporting more masks would increase the number of accesses, because in the worst case all masks may have to be checked for a match to a packet. This is because an arriving packet offers no guidance as to which mask might produce a match.

TABLE 4

| Prefix | Forwarding Information |
|---|---|
| 138.100.17.0/24 | RIF1 |
| 138.100.17.23/32 | RIF2 |
| 138.100.18.0/24 | RIF3 |
| 144.0.0.0/8 | RIF4 |

If a packet to destination IP 144.20.31.4 arrives, we can create an entry on the cache with mask M=8 that uses only the 8 most significant bits. This means that any packet that starts with 144 can use that cache entry. On the other hand, if a packet arrives with a destination IP 138.100.17.10, it must be cached with mask M=32. Using a mask M=24 would mean that packets to destination 138.100.17.23 would be forwarded to RIF1 instead of RIF2 as indicated in the second line of Table 4. This means that each IP address covered by the mask 138.100.17.0/24 would require a different cache entry. Finally, a packet destined for 138.100.18.51 can use a mask M=24.

Supporting several masks implies that some packets will require several accesses, each using a different mask. To minimize this issue, a first mask M, can be used for caching and also to store the length of the mask to use for the cases on which the first mask is not valid. This was the scheme proposed in the above-noted U.S. Patent Application Publication No. 20170366502. This method has limitations in some applications. In IP routing, when a shorter mask than M can be used, we need a cache entry on the first access for each M value and therefore we cannot benefit from the shorter mask to reduce the number of cache entries. For example, if M=16 in the Table 4, a packet destined for 144.20.31.4 would create a cache entry with mask 144.20. Another packet destined for 144.54.231.1 would create another cache entry with mask 144.54 even though all packets to 144.x.x.x use the same route.

In applications that use more complex rules that include LPM fields, such as firewalls, we only need to obtain the length of the mask to use and not the routing information base (RIB) as the IP address is only one of the fields of the rules. In that case, requiring a cache entry for each of the IP fields in the rules would be overly complex as the goal of the field checking is to determine the mask for the entire rule. Therefore in that application a small, simple table is more appropriate.

First Embodiment

In embodiments of the invention a hash table is formed by S entries that can hold an integer number that determines the length of a mask to be used for caching. Incoming elements are mapped to a position in the table using a hash function h(x), where x is the LPM field masked with an initial mask M. The value stored in the table at that position is the mask length for caching. The hash table is filled with all the prefixes that exist in a set of rules being evaluated.

When a prefix p has a length lp that is larger than M, we simply apply the mask to the prefix to obtain pm and compute h(mp). Then we access the hash table and read position h(mp). If the value stored at that entry table is smaller than the length Lp, then we write Lp into the entry, replacing the previous entry.

When the prefix p has a length $1_p$ shorter than M, it is expanded to length M by creating $2^{(M-L_p)}$ prefixes of length M and the previous procedure is applied to each of those expanded prefixes using the original length lp to fill in the positions in the hash table.

Figure 2:
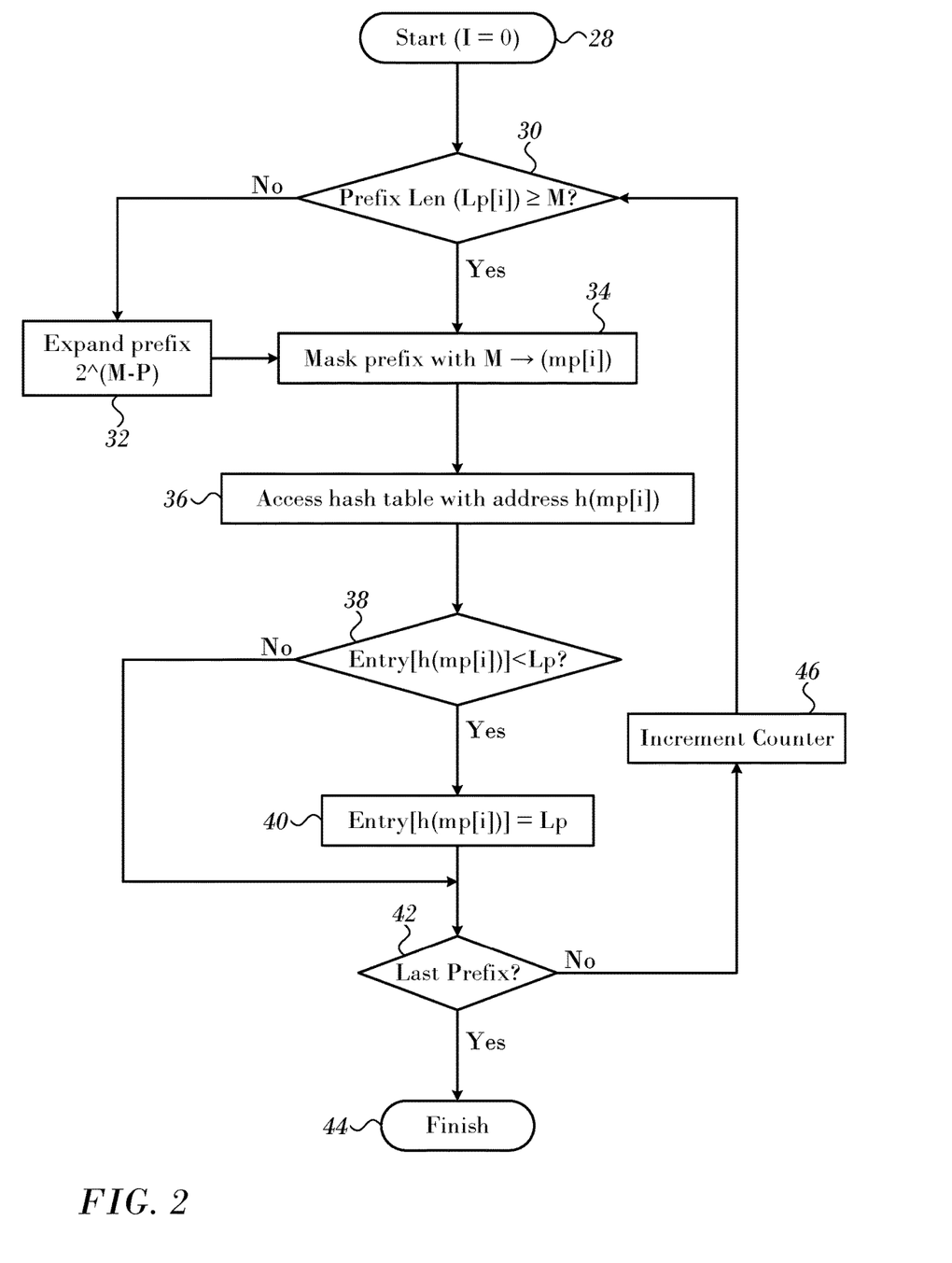
FIG. 2 is a flow chart of a method of populating a hash table in accordance with an embodiment of the invention.

The algorithm is explained in further detail in FIG. 2, which is a flow chart of a method of populating a hash table in accordance with an embodiment of the invention. The process steps are shown in a particular linear sequence in FIG. 2 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 28, and a counter i is set to zero. A value M is selected. The procedure for determining the value M is discussed below. The entries in the hash table are initialized to zero.

Next, at decision step 30, it is determined if the length of the $i^{th}$ prefix in a set (referred to as the current prefix) is obtained (len(Lp[i[)) is equal or exceeds the value M. If the determination at decision step 30 is negative, then control proceeds to step 32. The prefix is expanded by the value $2^{(M-P)}$, where P=Lp[i].

After performing step 32 or if the determination at decision step 30 is affirmative, then control proceeds to step 34. The current prefix or each of the expanded prefixes is masked with the value M as the case may be.

Next, at step 36 an arbitrary hash function h(x) is applied to the current prefix (and each member of its expansion if appropriate) to access a hash table. Decision step 38 is performed at each access. It is determined if the entry in the hash table is less than the prefix length Lp of the prefix (x) to which the function h(x) is applied. If so, then the current entry is replaced by the prefix length Lp at step 40.

Decision step 42 is performed after completion of step 40 or if the determination at decision step 38 was negative. Here it is determined if the last prefix in the set of rules has been evaluated. If so, the procedure terminates at final step 44. Otherwise the counter i is incremented at step 46. Then control returns to decision step 30 to iterate the procedure with another prefix from the rule set.

Figure 3:
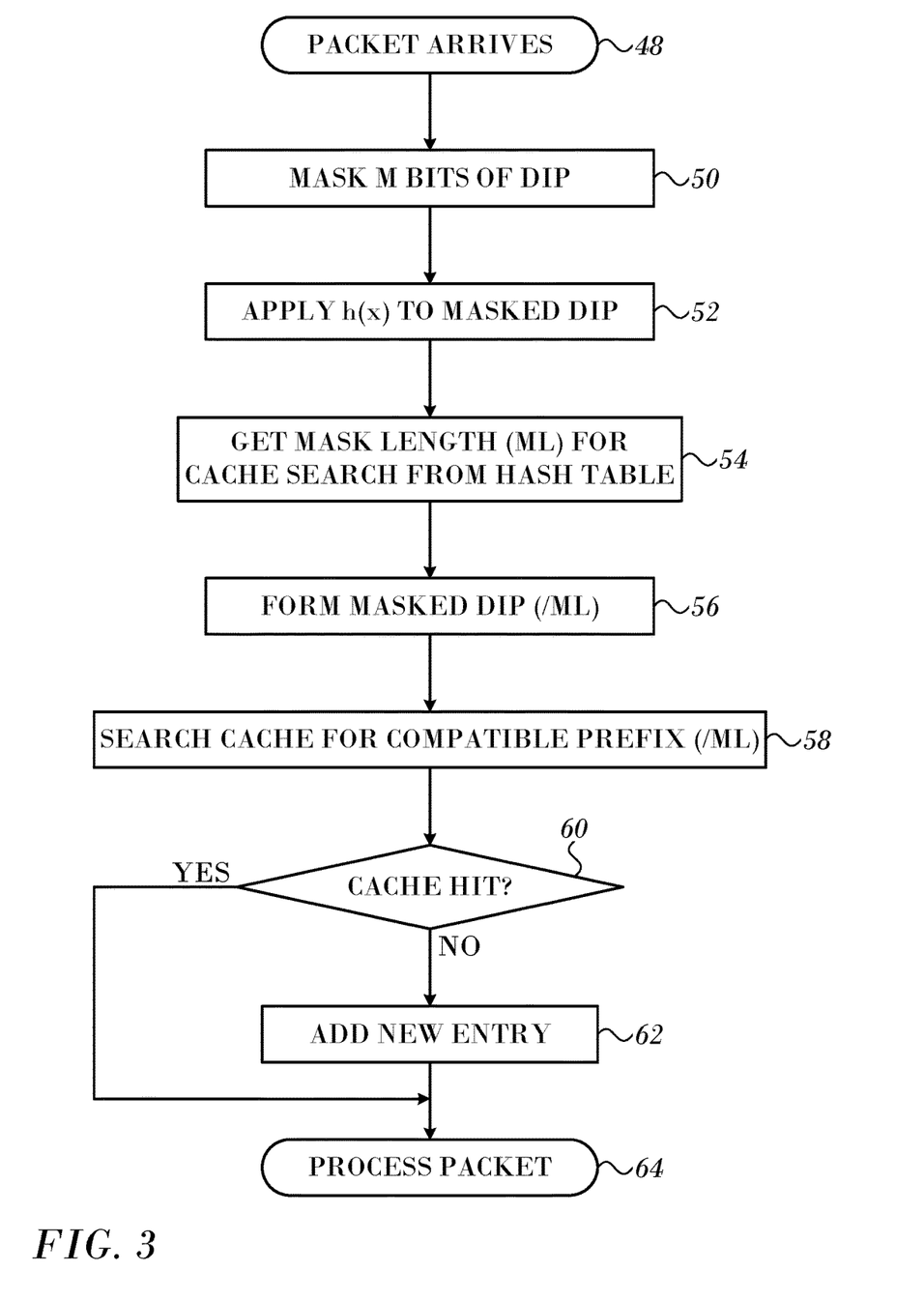
FIG. 3 is a flow chart illustrating the application of a hash table to an incoming packet x, in accordance with an embodiment of the invention.

Reference is now made to FIG. 3, which is a flow chart illustrating the application of a hash table to an incoming packet x, in accordance with an embodiment of the invention. It is assumed that the value M is known, the procedure described with respect to FIG. 2 has been performed and the hash table is fully populated. It is also understood that a cache of prefixes, e.g., cache 22 (FIG. 1), is implemented.

At initial step 48 a new packet arrives. At step 50 M most significant bits of the destination IP address (DIP) are masked (/M).

Next, at step 52 the hash function, h(x), which was used in step 36 (FIG. 2) is applied to the masked DIP (/M) to access the hash table.

Next, at step 54 the entry of the hash table that was accessed in step 52 is read. The entry contains the mask length (ML) to be applied to the DIP of the current packet.

Next, at step 56 the ML most significant bits of the DIP of the current packet are masked (/ML). Then at step 58 the cache of prefixes is searched for a compatible prefix with the result of step 56, for example using hash functions. The mask /ML assures that a cache hit will yield the longest compatible prefix in the routing table for a /M prefix. Any suitable method for cache searching can be used to search the cache of prefixes. For example, using multi-way hash tables, i.e., there are multiple table entries per index. One method of searching such hash tables is taught in commonly assigned U.S. Pat. No. 9,892,057, entitled Single Double Cuckoo Hash, which is herein incorporated by reference.

Next, at decision step 60, it is determined if the search in step 58 resulted in a cache hit. If the determination is negative, then control proceeds to step 62. The main routing table is consulted and a new entry added to the cache of prefixes.

After performing step 62 or if the determination at decision step 60 is affirmative, control proceeds to final step 64. The packet is processed conventionally. For example, forwarding information from the matched entry in the cache of prefixes may be retrieved and the packet forwarded accordingly.

The main parameters in the methods described with respect to FIG. 2 and FIG. 3 are the table size S and the initial mask length M. The size of the table determines the amount of memory needed to implement the scheme. Using simulations the cache hit rate is 2-3 times as high as when exact match is used.

Example 1

TABLE 5

| Route | Masked with /3 | Position (Hash Value) | Mask Length to Use |
|---|---|---|---|
| 138.100.17.0/24 | 100 | 3 | 24 |
| 138.100.17.23/32 | 100 | 3 | 32 |
| 138.100.18.0/24 | 100 | 3 | 24 |
| 144.0.0.0/8 | 100 | 3 | 8 |

TABLE 6

| Position | Value |
|---|---|
| 1 | 0 |
| 2 | 0 |
| 3 | 32 |
| 4 | 0 |
| 5 | 0 |
| 6 | 0 |
| 7 | 0 |
| 8 | 0 |

This example illustrates the operation of the hash table scheme described above. Routing table 5 has the same routing information as Table 4. An initial mask is set at M=3. The hash table shown in Table 6 has eight positions and is populated by the procedure of FIG. 3 as applied to the entries in Table 5.

Assume that a packet arrives with destination IP 130.100.14.67. The mask M=3 is applied to obtain binary 100. Applying the hash function results in an access of row 3 in Table 6. A mask length of 32 is retrieved from the second column to access the cache of prefixes. It will now be evident that all IPs that start with binary 100 need to be cached with a mask of 32 bits. On the other hand, all the IP addresses that map to the other positions on the table can be mapped with a zero bit mask, which is equivalent to providing a default route.

Example 2

In this example an initial mask M=4 is used. The routing information of the previous example is shown in Table 7. However the hash values are different. The populated hash table is shown in Table 8.

TABLE 7

| Route | Masked with /4 | Position (Hash Value) | Mask Length to Use |
|---|---|---|---|
| 138.100.17.0/24 | 1000 | 5 | 24 |
| 138.100.17.23/32 | 1000 | 5 | 32 |
| 138.100.18.0/24 | 1000 | 5 | 24 |
| 144.0.0.0/8 | 1001 | 2 | 8 |

TABLE 8

| Position | Value |
|---|---|
| 1 | 0 |
| 2 | 8 |
| 3 | 0 |
| 4 | 0 |

TABLE 8-continued

| Position | Value |
|---|---|
| 5 | 32 |
| 6 | 0 |
| 7 | 0 |
| 8 | 0 |

At least some of the mask lengths (Value) in Table 8 are larger than in Table 6, which indicates that selecting the value of the initial mask M is not straightforward.

Insertions and Deletions.

Insertion and deletion of rules is supported by the proposed hash tables, e.g., Tables 6, 8. To add a rule, we simply need to apply the initial mask, perform the hash, read the value on the hash table entry, and if the length of the prefix is longer than the read value, replace the value field in the hash table with the length of the prefix.

To remove a rule, the process is more complex. In one embodiment the routing table is searched to identify all the entries that map to that position on the hash table; then it is determined if after removing the entry, the value on the table needs to be updated. The procedure is detailed in FIG. 4 and is similar to FIG. 2. As in FIG. 2, the steps of FIG. 4 can be performed in different orders, asynchronously, or concurrently in an efficient implementation.

Figure 4:
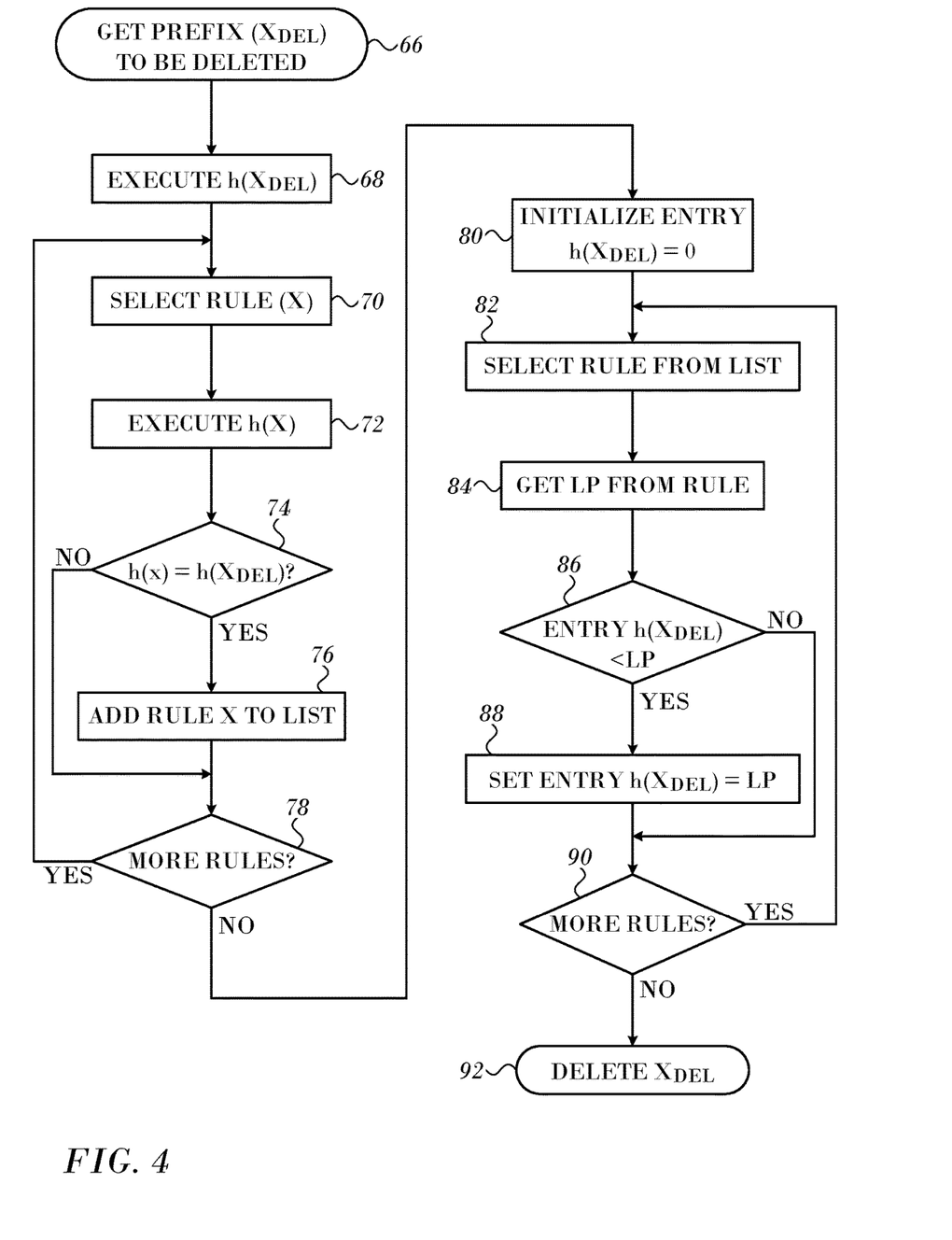
FIG. 4 is a flow chart of a method of removing a rule in accordance with an embodiment of the invention.

At initial step 66 the prefix of the rule to be deleted is specified ($X_{DEL}$), and the value in its hash table entry $h(X_{DEL})$ ascertained in step 68. Then the rule table is searched for entries that hash to $h(X_{DEL})$. At step 70 a rule is selected and its hash entry h(x) determined in step 72.

Next, at decision step 74, it is determined if the hash entry that was determined in step 72 is the same as the hash entry $h(X_{DEL})$ that was ascertained in step 68. If the determination at decision step 74 is affirmative, then control proceeds to step 76. The current rule's prefix is added to a list of rules in which the hash values map to the position of the entry to be deleted.

After performing step 76 or if the determination at decision step 74 is negative, control proceeds to decision step 78, where it is determined if more rules in the routing table remain to be processed. If the determination at decision step 78 is affirmative, then control returns to step 70 to select another rule.

If the determination at decision step 78 is negative, then the value in the hash entry $h(X_{DEL})$ is reevaluated to determine if the absence of the rule to be deleted affects its value. The following sequence of steps is similar to the procedure of FIG. 2, except the smaller list prepared in step 76 is used instead of the entire set of rules, and any expansions have already been carried out.

At step 80 the hash entry $h(X_{DEL})$ is initialized to zero. Then at step 82 a rule from the list prepared in step 76 is selected. Its prefix length LP is obtained in step 84.

Next, at decision step 86, it is determined if the value in the hash entry $h(X_{DEL})$ is less than the prefix length obtained in step 84. If the determination at decision step 86 is affirmative, then at step 88 the value in the hash entry $h(X_{DEL})$ is replaced by the prefix length obtained in step 84.

After performing step 88 or if the determination at decision step 86 is negative, then at decision step 90, it is determined if more rules from the list prepared in step 76 remain to be processed. If the determination at decision step 90 is affirmative, then control returns to step 82 to select another rule.

If the determination at decision step 90 is negative, then control proceeds to final step 92. The rule corresponding to the prefix selected in initial step 66 is deleted from the routing table and the procedure ends.

Determination of the Mask Length M.

An important issue is how to determine the value M to use. The heuristic denoted below measures the collisions caused by the hash table. The procedure is summarized as follows:

Construct the hash table and set a counter to zero.
Take each prefix value that appears on the database:
  If its length p>M then access the table with /M and check if the value v stored there is larger than p. If so, add one to the counter.
  If its length p<M then expand to /M and access the table for all the /M and check if the value v stored there is larger than p. If so, add $1/(2^{(M-P)})$ to the counter for each /M for which that occurs.
Repeat the process for each value of M and pick the one that is associated with the lowest value of the counter.

Figure 5:
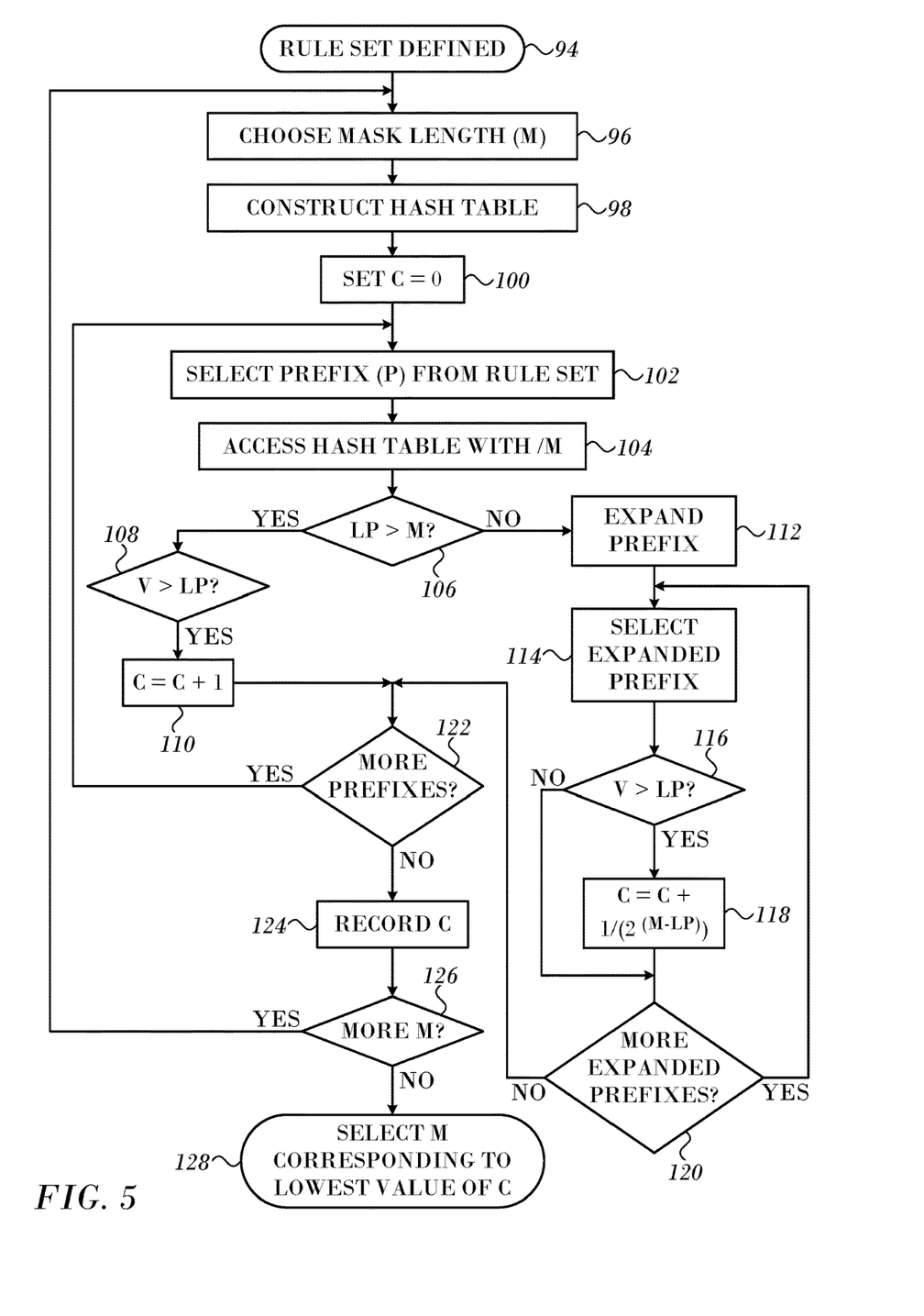
FIG. 5 is a flow chart of a method for determining the mask length in accordance with an embodiment of the invention.

The operation is illustrated in greater detail in FIG. 5, which is a flow chart of a method for determining the mask length M in accordance with an embodiment of the invention. The steps of the method need not be performed in the order shown, but may be performed in a parallel implementation or in different orders.

In initial step 94 a set of rules is established, for example in a network switch or NIC. Then, in step 96 a value of the mask length M is chosen from a set of values to be compared for efficacy.

Next, at step 98 a hash table is prepared from the set of rules as described above in the discussion of FIG. 2. The steps that follow are performed for each prefix in the set of rules.

A counter (C) is initialized to zero in step 100. Next, at step 102 a rule is selected and its prefix P read. In the following steps the prefix will be compared with the current value of M. Control proceeds to step 104. The hash table is accessed using the current value of M (/M) and the value (V) in the hash table entry read.

At decision step 106 it is determined if the length of the length of the current prefix (LP) exceeds the length of the current value of the mask M.

If the determination at decision step 106 is affirmative, then, at decision step 108 it is determined if the value (V) that was obtained in step 104 from the hash table entry exceeds the current length of the prefix (LP). If the determination at decision step 108 is affirmative, then the counter C is incremented by 1 in step 110. Control then proceeds to decision step 122, which is discussed below.

If the determination at decision step 106 is negative, then control proceeds to step 112. The current prefix is expanded by the value $2^{(M-LP)}$, in the same manner as in step 32 (FIG. 2). The expanded prefixes are compared with the value V in the following steps.

At step 114 one of the prefix in the expansion is selected.

Next, at decision step 116, it is determined if the value (V) that was obtained in step 104 from the hash table entry exceeds the current length of the prefix (LP). If the determination at decision step 116 is affirmative, then control proceeds to step 118. The counter C is incremented by $\frac{1}{2}^{(M-LP)}$.

In some embodiments the value in the hash table is used to define a mask for rule caching as described in commonly assigned application Ser. No. 15/469,530, entitled Field Checking Based Caching of ACL Lookups to Ease ACL Lookup Search and Ser. No. 15/663,758, entitled Efficient Caching of TCAM Rules in RAM, the disclosures of which are herein incorporated by reference. The counter in these embodiments is incremented by the number of rules in which the prefix appears (num_rules with prefix) or $\{(\text{num\_rules with prefix})/\frac{1}{2}^{(M-LP)}\}$.

After performing step 118 or if the determination at decision step 116 is negative, then at decision step 120, it is determined if more of the expanded prefixes resulting from step 112 need to be evaluated. If the determination at decision step 120 is affirmative, then control returns to step 114 and another of the expanded prefixes is selected.

If the determination at decision step 120 is negative or after performing step 110 then the evaluation of the current prefix from the rule set has been completed using the current value of the mask length M. Next, at decision step 122, it is determined if more prefixes from the rule set remain to be evaluated. If the determination at decision step 122 is affirmative, then control returns to step 102 to iterate the evaluation using another prefix from the rule set.

If the determination at decision step 122 is negative, then control proceeds to step 124. The value of the counter C is recorded and associated with the current value of the mask M.

Next, at decision step 126, it is determined if the above-described steps have been performed with all the intended values of the mask length M. If the determination at decision step 126 is negative, then control returns to step 96, to iterate the procedure with another mask length M.

If the determination at decision step 126 is affirmative, then control proceeds to final step 128. The value of the mask length M that is associated with the lowest value of the counter C is selected for use in the algorithms that are described above.

Changing the Mask Length M.

Because the initial mask length M influences the effectiveness of the cache lookup, depending on the rules in the database and changes in the traffic pattern over time, it is desirable to change the mask length M dynamically from a present value ($M_{old}$) to a new value ($M_{new}$).

Figure 6:
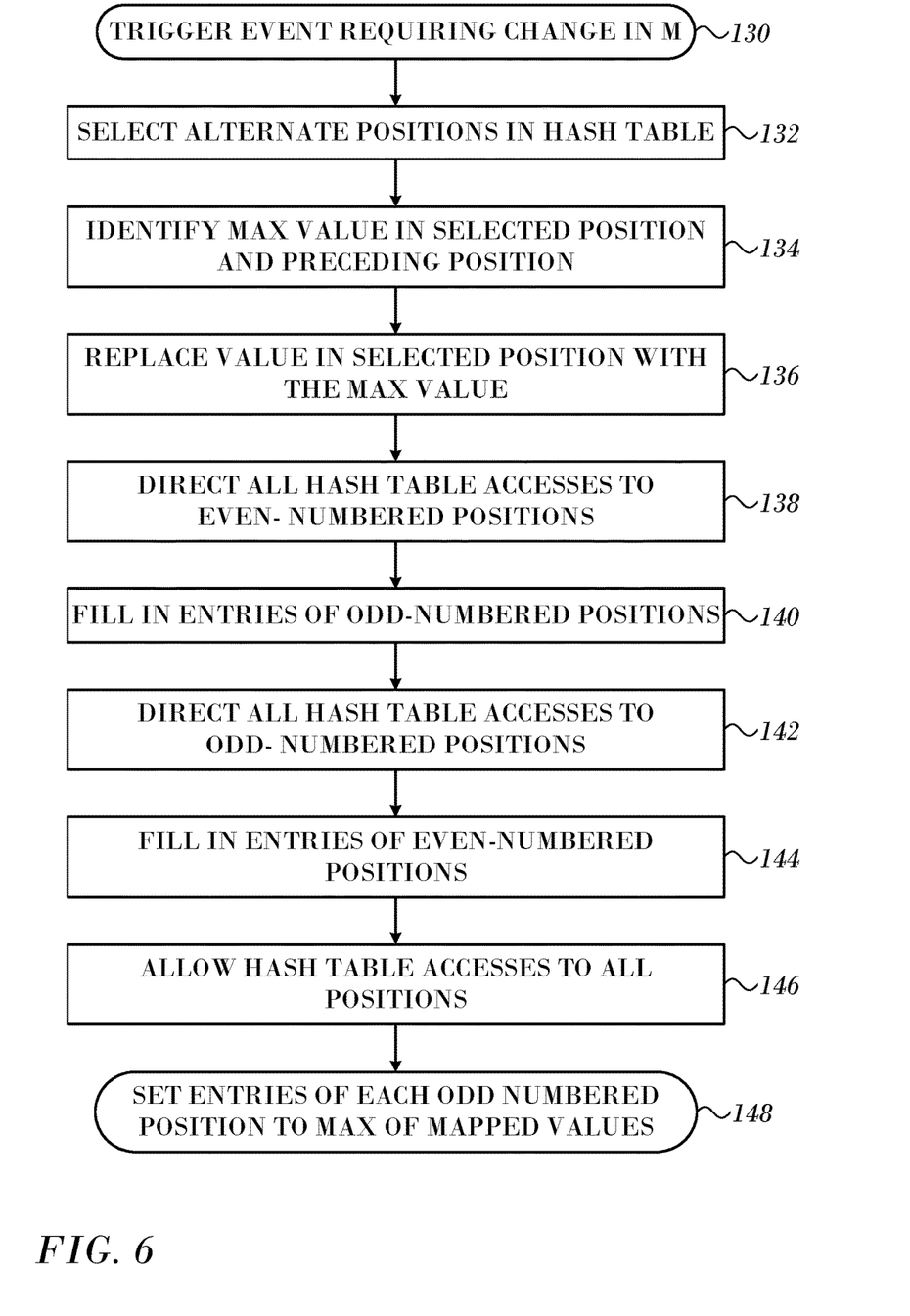
FIG. 6 is a flow chart of a method of dynamically varying the mask length in accordance with an embodiment of the invention.

Reference is now made to FIG. 6, which is a flow chart of a method of dynamically varying the mask length M in accordance with an embodiment of the invention. The procedure of FIG. 6 allows the value of the mask length M to be changed dynamically without requiring additional memory. The discussion can be followed by viewing changes in the values of four successive hash table entries. The initial positions are as follows:

| POSITION | 1 | 2 | 3 | 4 |
|---|---|---|---|---|
| VALUE | 16 | 24 | 32 | 8 |

At initial step 130 the need to change the mask length M is recognized according to some triggering criterion, e.g., a statistical change in the flow pattern, or elapse of a predefined time interval.

Next, at step 132 even-numbered positions in the hash table are selected. Then in step 134 the maximum value in the each selected position and its preceding position is identified. For example, the maximum value of the entry in position 2 and position 1 of the hash table is identified. The terms "even-numbered" and "odd-numbered" are used arbitrarily herein to distinguish members of a pair of consecutive positions in the hash table. These terms have no physical meanings with respect to the actual configuration of the hash table.

Next, at step 136 in each pair of selected and preceding positions, the value in the selected position is updated with the maximum value obtained in step 134. Thus, in the case of the pair comprising position 2 and position 1 of the hash table, the value of position 2 is replaced by the maximum value obtained in step 134. In the hash table position 2 is unchanged because the value 24 is the maximum of the tuple (16, 24), Position 4 has been set to the maximum of the tuple (32, 8). The hash table now has the following configuration.

| POSITION | 1 | 2 | 3 | 4 |
|---|---|---|---|---|
| VALUE | 16 | 24 | 32 | 32 |

Next, at step 138 accesses to the hash table are limited to even-numbered positions. This is done by setting the least significant bit of the result of the hash function h(x) to zero. After completing step 138 only half of the hash table is being used and the entries in this half is accessed with the hash function h(x) by masking prefixes with the mask length $M_{old}$.

Next, at step 140 the entries of the odd-numbered positions are set to the maximum of the pairs of odd- and even-numbered values found using $M_{new}$ as the mask length. For example, all prefixes that map to positions 1 or 2 using $M_{new}$ are identified and the longer prefix length of the two set as the value for position 1. The hash table now has the following configuration.

| POSITION | 1 | 2 | 3 | 4 |
|---|---|---|---|---|
| VALUE | 15 | 24 | 31 | 32 |

Next, at step 142 accesses to the hash table are limited to odd-numbered positions. This is done by setting the least significant bit of the result of the hash function h(x) to one. This means that only half of the hash table can be accessed. The entries in this half are then accessed with the hash function h(x) by masking the prefixes of new packets with the mask length $M_{new}$.

Next, at step 144 the entries of the even-numbered positions are set to the maximum of the values that map found to those positions, respectively, using $M_{new}$ as the mask length. The hash table now has the following configuration.

| POSITION | 1 | 2 | 3 | 4 |
|---|---|---|---|---|
| VALUE | 15 | 8 | 31 | 31 |

Next, at step 146 setting the least significant bit of the result of the hash function h(x) is discontinued, and access to all positions of the hash table are allowed. The prefixes are masked with the mask length $M_{new}$ when invoking the hash function h(x). However, the values for the odd-numbered positions may not be optimal.

In final step 148 the entries of the odd-numbered positions are set to the maximum of the values that map to those positions, respectively, using $M_{new}$ as the mask length. The hash table now has the final configuration.

| POSITION | 1 | 2 | 3 | 4 |
|---|---|---|---|---|
| VALUE | 15 | 8 | 28 | 31 |

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication, comprising the steps of:
    assigning a mask length;
    receiving via a data network a packet having a destination address;
    providing a cache memory having cache entries that correspond to addresses of a main memory, the destination address and the cache entries each comprising a binary number having most significant bits;
    masking the destination address with the mask length;
    applying a hash function to the masked destination address to access a hash table;
    obtaining a value from the hash table;
    determining that a number of most significant bits in one of the cache entries and the number of most significant bits of the destination address are identical, wherein the number of most significant bits is equal to the value obtained from the hash table; and
    retrieving routing information for the packet from the one cache entry.

2. The method according to claim 1, wherein a rule set comprises prefixes having respective prefix lengths, further comprising populating the hash table by the steps of:
    for each prefix in the rule set:
    masking the prefix with the mask length;
    applying the hash function to the masked prefix to access the hash table; and
    in an event that the value in the accessed hash table is smaller than the prefix length of the prefix, replacing the value with the prefix length of the prefix.

3. The method according to claim 2, further comprising adding a new prefix to the cache memory.

4. The method according to claim 2, wherein assigning a mask length comprises the steps of:
    For each of a set of candidates performing the steps of:
    for each prefix in the rule set:
    masking a current prefix with a current candidate to generate a candidate-masked prefix;
    applying the hash function to the candidate-masked prefix to access the hash table;
    associating a count of events with the current candidate wherein the value in the accessed hash table is larger than the prefix length of the current prefix; and
    thereafter choosing the candidate having a lowest associated count of events as the mask length.

5. The method according to claim 4, wherein assigning a mask length further comprises the steps of:
    when the prefix length of the current prefix is less than the value in the accessed hash table generating expanded prefixes from the current prefix, the prefix length of the expanded prefixes being equal to the current candidate; and
    increasing the associated count of events for the current candidate when the value in the accessed hash table is larger than the prefix length of the expanded prefixes.

6. The method according to claim 3, wherein adding a new prefix comprises the steps of:
    masking the new prefix with the mask length;
    accessing the hash table with the masked new prefix;
    determining that the value in the accessed hash table is smaller than a number of most significant bits of the new prefix; and
    replacing the value with the prefix length of the new prefix.

7. The method according to claim 2, further comprising deleting a specified prefix of the rule set from the cache memory.

8. The method according to claim 7, wherein deleting a specified prefix comprises the steps of:
    masking the specified prefix with the mask length;
    applying the hash function to the masked specified prefix to identify a target entry in the hash table;
    identifying other prefixes of the rule set that hash to the target entry by masking with the mask length and applying the hash function; and
    replacing the value of the target entry with a largest prefix length of the other prefixes.

9. The method according to claim 1, further comprising the steps of:
    dynamically changing the mask length to a new mask length; and
    updating the hash table using the new mask length.

10. The method according to claim 9, wherein updating the hash table comprises the steps of:
    prohibiting access to one half of the hash table and allowing access to another half of the hash table;
    while prohibiting access to the one half of the hash table updating values thereof using the new mask length;
    thereafter prohibiting access to the other half of the hash table and allowing access to the one half of the hash table;
    while prohibiting access to the other half of the hash table updating the values thereof using the new mask length; and
    thereafter allowing access to all of the hash table.

11. The method according to claim 10, wherein the one half of the hash table and the other half of the hash table comprise alternate positions of the hash table.

12. An apparatus, comprising:
    a network element operative for receiving via a data network a packet having a destination address;
    a processor in the network element;
    a main memory storing a database of packet forwarding information;
    a hash table stored in a memory, the database and the hash table accessible to the processor;
    a cache memory accessible to the processor, the cache memory having cache entries therein that represent a portion of the packet forwarding information of the main memory, the destination address and the cache entries each comprising a binary number having most significant bits, wherein the processor is operative to perform the steps of;
    assigning a mask length;
    masking the destination address with the mask length;
    applying a hash function to the masked destination address to access the hash table;

obtaining a value from the hash table;

determining that a number of most significant bits in one of the cache entries and the number of most significant bits of the destination address are identical, wherein the number of most significant bits is equal to the value obtained from the hash table; and retrieving routing information for the packet from the one cache entry.

13. The apparatus according to claim 12, wherein a rule set comprises prefixes having respective prefix lengths, wherein the processor is operative for populating the hash table by the steps of:

for each prefix in the rule set:

masking the prefix with the mask length;

applying the hash function to the masked prefix to access the hash table; and in an event that the value in the accessed hash table is smaller than the prefix length of the prefix, replacing the value with the prefix length of the prefix.

14. The apparatus according to claim 13, wherein the processor is operative for adding a new prefix to the cache memory.

15. The apparatus according to claim 13, wherein assigning a mask length comprises the steps of:

For each of a set of candidates performing the steps of:

for each prefix in the rule set:

masking a current prefix with a current candidate to generate a candidate-masked prefix;

applying the hash function to the candidate-masked prefix to access the hash table;

associating a count of events with the current candidate wherein the value in the accessed hash table is larger than the prefix length of the current prefix; and thereafter choosing the candidate having a lowest associated count of events as the mask length.

16. The apparatus according to claim 15, wherein assigning a mask length further comprises the steps of:

when the prefix length of the current prefix is less than the value in the accessed hash table generating expanded prefixes from the current prefix, the prefix length of the expanded prefixes being equal to the current candidate; and increasing the associated count of events for the current candidate when the value in the accessed hash table is larger than the prefix length of the expanded prefixes.

17. The apparatus according to claim 14, wherein adding a new prefix comprises the steps of:

masking the new prefix with the mask length;

accessing the hash table with the masked new prefix;

determining that the value in the accessed hash table is smaller than a number of most significant bits of the new prefix replacing the value with the number of most significant bits of the new prefix; and replacing the value with the prefix length of the new prefix.

18. The apparatus according to claim 13, wherein the processor is operative for deleting a specified prefix of the rule set from the cache memory.

19. The apparatus according to claim 18, wherein deleting a specified prefix comprises the steps of:

masking the specified prefix with the mask length;

applying the hash function to the masked specified prefix to identify a target entry in the hash table;

identifying other prefixes of the rule set that hash to the target entry by masking with the mask length and applying the hash function; and replacing the value of the target entry with a largest prefix length of the identified other prefixes.

20. The apparatus according to claim 12, wherein the processor is operative for the steps of:

dynamically changing the mask length to a new mask length; and updating the hash table using the new mask length.

21. The apparatus according to claim 20, wherein updating the hash table comprises the steps of:

prohibiting access to one half of the hash table and allowing access to another half of the hash table;

while prohibiting access to the one half of the hash table updating values thereof using the new mask length;

thereafter prohibiting access to the other half of the hash table and allowing access to the one half of the hash table;

while prohibiting access to the other half of the hash table updating the values thereof using the new mask length; and thereafter allowing access to all of the hash table.

22. The apparatus according to claim 21, wherein the one half of the hash table and the other half of the hash table comprise alternate positions of the hash table.

* * * * *